Dec. 26, 1961  L. S. BOHL ET AL  3,014,369
ATMOSPHERIC INFRARED RADIATION DETECTOR
Filed June 17, 1957
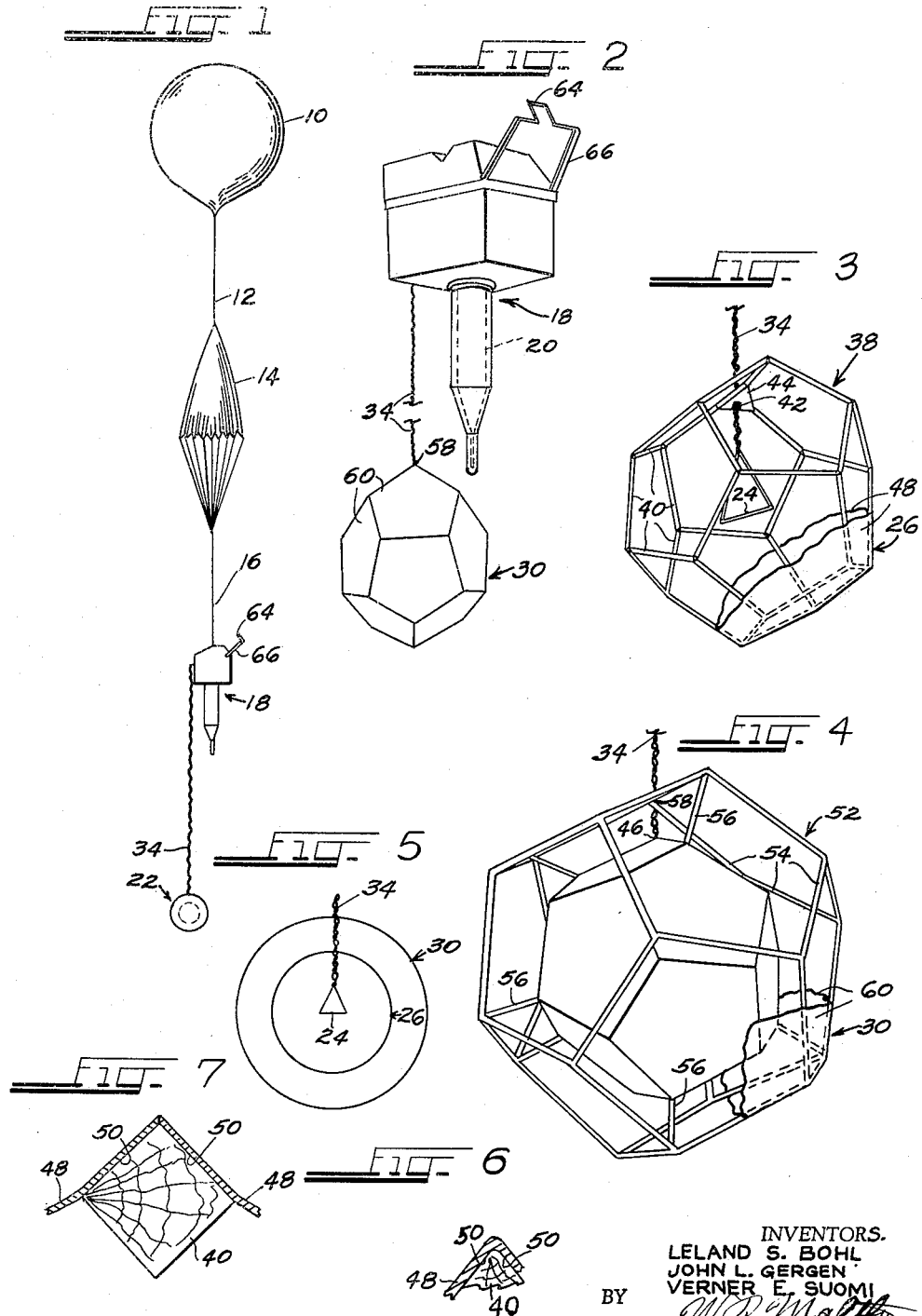
INVENTORS.
LELAND S. BOHL
JOHN L. GERGEN
VERNER E. SUOMI
BY

United States Patent Office 3,014,369
Patented Dec. 26, 1961

3,014,369
ATMOSPHERIC INFRARED RADIATION DETECTOR
Leland S. Bohl, Schenectady, N.Y., John L. Gergen, Minneapolis, Minn., and Verner E. Suomi, Madison, Wis., assignors, by mesne assignments, to the United States of America as represented by the Secretary of the Navy
Filed June 17, 1957, Ser. No. 666,258
15 Claims. (Cl. 73—170)

This invention relates to the detection of infrared radiation, and more particularly to means for obtaining evidence from which the terrestrial and atmospheric infrared radiation incident on a point in space can be computed.

The total terrestrial and atmospheric infrared radiation is one of the factors affecting the earth's heat balance, weather, and other climatic phenomena, and balloon and satellite behavior, so that knowledge of this factor makes for better understanding of the processes by which such phenomena and behavior are brought about. Such knowledge would also be of great value in determining the extent to which this factor has influenced the development and duration of ice and tropical ages, and can indicate to what extent mankind's activities, particularly the burning of fossil fuels and thus adding to the atmosphere's carbon dioxide content, can influence large scale climatic changes in the future.

Heretofore, attempts to obtain such knowledge have been confined to theoretical analysis, without verifying or contradictory evidence, and to ground measurement.

It is an object of the invention to provide a device which is capable, at any point in space at which it is located, of influencing the coding of a function of the total (up and down) terrestrial and atmospheric infrared radiation incident on that point.

Another object is to provide such a device which is reliable and may be produced at expendable cost.

Further objects and advantages of the invention will appear as the description proceeds.

The invention will be better understood on reference to the following description and the accompanying drawing, wherein:

FIG. 1 is an elevational view of an embodiment of the invention airborne by a balloon.

FIG. 2 is an enlargement of portions of FIG. 1.

FIG. 3 is a fragmentary elevational view of the inner shell, part of the cover being removed to show the skeleton and inner temperature sensor.

FIG. 4 is a fragmentary elevational view of the shielded device, part of the cover of the outer shell being removed to show the outer skeleton and the inner shell.

FIG. 5 is a schematic view showing the temperature sensor within the inner shell and the latter within the outer shell.

FIGS. 6 and 7 are magnified sectional views showing in part how the shell structure may be assembled.

Referring now more particularly to FIG. 1, there is shown at 10 a balloon having a load line 12 and suspending a parachute 14 which in turn at 16 suspends a box 18 housing telemetering apparatus, part of which is indicated at 20, and a unit 22 embodying features of the invention.

The unit 22 in accordance with one form of the invention comprises a temperature-sensitive element such as a thermistor 24 spaced from and enveloped by a shell 26 having a black outer surface 28 rendering the shell substantially a black body for the absorption of infrared radiation from the earth and the atmosphere, a shell 30 enveloping and spaced from the first shell and substantially transparent to such radiation, and insulated leads 34, preferably in the form of a twisted pair, extending from the thermistor through the shells to the telemetering apparatus 20.

For illustrative purposes the shells 26 and 30 are shown in the form of regular dodecahedrons. The inner shell 26 comprises a skeleton 38 whose ribs 40 are preferably in the form of matchstick-like strips of balsa wood glued together at all apices. This skeleton structure is desirable because it affords adequate strength, is of light weight, and occupies negligible space compared to the area of the shell 26. The insulated part of the wiring 34 is passed through and is glued in a slot 42 in a balsa wood bracket 44 glued to the ribs 40 near an apex 46 of the skeleton 38, and the wiring is preferably sufficiently stiff to hold the thermistor 24 approximately at the center of the skeleton. Panels of film 48, such as model airplane tissue, are cemented as at 50 flat to the ribs 40 and extend around the outer corners of the ribs (FIG. 6) or are trimmed thereat (FIG. 7). The shell 26 is completed upon the coating of the tissue 48 throughout its outer surface with a black "dope" 28 to afford substantially perfect radiation absorptivity in the infrared radiation wavelength range from about one to about 90 microns.

The outer shell 30 comprises a skeleton 52 made similarly to the inner skeleton 38 but of course using longer ribs 54 and film which is highly transparent to terrestrial and atmospheric infrared radiation. With the skeleton 38 arranged substantially concentric with the skeleton 52, a suitable number of balsa wood ribs serving as spacing struts 56 are glued at their ends to adjacent apices of the respective skeletons to afford a stable connection between the skeletons. The leads 34 are glued preferably to the nearest apex 58, and may be sufficiently stiff to serve as a spacing strut. Panels of film 60, such as Mylar or polyethylene, having a high infrared radiation transmission coefficient over a wavelength range from about one to about 90 microns, are cemented flat to the ribs 54 and trimmed to complete the outer shell 30 as in the manner noted with the inner shell 26. The junctures of the films may be trimmed by a hot tool which fuses them together (FIG. 7). Polyethylene and Mylar are suitable film materials because of strength, ease in handling, and low infrared radiation absorptivity. For the strength needed, Mylar film .00025" thick can be used. If the desired strength is present, the thinner the better, since radiation transparency increases as the thickness decreases for a given material.

Where the inter-shell medium is air or other gas, each shell may be formed with a pin hole or with small clearance where the wiring 34 passes therethrough to enable the pressure within the shells to be equalized with that of the atmosphere so that the shells will not be strained or burst at upper altitudes. Or, normal leakage through the shells may be relied upon for such pressure equalization.

The lead wires 34 may constitute also the means by which the unit 22 is suspended from the telemetering apparatus 20. An outer thermistor 64, also connected to the telemetering apparatus 20, is matched with the inner thermistor 24 and mounted on a bracket 66 projecting out from the housing 18 for sensing the atmospheric air temperature. The unit 22 and thermistor 64 are sufficiently remote from the telemetering apparatus 20 to preclude their being influenced by heat emanating from the apparatus.

The skeletons may be conveniently constructed with the use of jigs.

The device 22 accordingly is a means for measuring the total terrestrial and atmospheric radiation at any point in space.

If it is desired to obtain separate indications of the up and down radiations, two units are used together, the inner shell of one being blackened on its upper half and covered on its lower half with a suitable infrared radiation reflector such as aluminum foil, and the inner shell of the other unit being similarly black at the bottom and reflective at the top. The two measurements may be averaged to obtain the total terrestrial and atmospheric radiation at a point in space, and one-half the difference between the two measurements is a measure of the net radiation at the point, or they may be otherwise combined to obtain various other atmospheric data.

The ideal form for the black body would appear to be either a horizontal disc or a sphere. To aproach the latter shape, one may construct the black body in polyhedral form. If the polyhedron is a dodecahedron or an icosahedron, the difference from spherical symmetry is then small, but the differences from sphericity for a tetrahedron are appreciable. It is difficult mathematically to justify the similarity of the behavior of a tetrahedral black body to that of a spherical black body, but from several experiments it appears that the equivalent radiation temperature of a black body, that is, the temperature of a black body unaffected by atmospheric convection but due solely to its radiation balance, is actually substantially independent of its shape.

A form of device 22 which has been used successfully comprises an inner shell having a dodecahedral skeleton formed of 2" ribs, and an outer shell having a dodecahedral skeleton formed of 3" ribs, with an intervening medium of air, the shells being substantially concentric, with their respective apices substantially radially alined, so that the distance from each face of the inner shell to the confronting face of the outer shell is about 1", the inner shell being about 95% efficient as an absorber of, and the outer shell being about 96% transparent to, infrared radiation in the wavelength range of about one to about 90 microns.

A device 22 so constructed weighed less than half an ounce, and it is apparent that the inner shell weighed substantially less than a fourth of an ounce. Thus its addition to the balloon load weight is practically negligible. Moreover, lightness of the inner shell is conductive to a low thermal time constant.

The sizes of the shells may be varied. Where the medium between the shells is a gas, the spacing should be such that heat conduction and convection by the medium will be substantially eliminated or minimized. The spacing noted above is satisfactory in this respect. The ratio of the areas of the design above noted is about 2.0. Bearing in mind the spacing factor noted above, this ratio is desirable. Reducing the inter-shell space sufficiently to render the inter-shell gas substantially heat-conductive is undesirable. The area ratio of about 2 is also desirable to hold the effect of convection of the intervening gas on the temperature of the inner shell substantially to a minimum. Any substantial increase in this ratio will bring about negligible reduction of such effect. Such effect will however increase with reduction in this ratio.

For the type of device in which the inter-shell medium is a gas, an inner shell of about 6" diameter is preferred, since a substantial increase in its diameter will afford substantially only marginal improvement in results and a substantially smaller diameter will be attendant with relatively poor results.

Knowledge of the equivalent radiation temperature at points in space is vital to an understanding of balloon behavior, and can enter into the design of balloons and balloon-ballasting systems, since an increase in terrestrial and atmospheric infrared radiation is a factor in raising a balloon and a decrease in such radiation is a factor in lowering a balloon.

The device 22 provides a means by which the rate at which the earth is losing heat can be determined. With this knowledge it may be possible to explain why and how winds develop, and air motion and transport of energy from one part of the earth to another takes place. These determinations are made simultaneously at different geographical positions. The differences in the observed radiation temperatures at such positions afford a measure of the transport of heat energy (by convection and radiation) from warm to cool places.

The element 24 observes the actual temperature of the inner shell 26. If there is air or other gas in the inner shell 26, the element 24 receives heat from the inner shell by convection as well as radiation. Convection (and the thermal time constant) prevents the inner shell 26 (black body) from attaining true radiative equilibrium. Because of these influences, the difference between the observed radiation temperature and the air temperature is roughly half what it should be in the absence of these influences. As noted, the equivalent radiation temperature is the temperature the black body would have in the absence of these influences. The correction factor, determined by calibration, is about 5% of the absolute equivalent radiation temperature but about 100% of the observed temperature difference. This correction factor is believed accurate within about 10%. (Thus, it appears that the measurements lead to an estimate of the equivalent radiation temperature whose absolute value should be accurate within about 1% from the ground to about 50 millibars.) From the equivalent radiation temperature, the equivalent radiation energy balance of the inner shell can be computed.

The air temperature as well as the observed radiation temperature must be known in order that the equivalent radiation temperature may be determined, since the latter is a constant times the difference between the two observed temperatures.

From the difference between the radiation and air temperatures at any point in space, and possibly other ordinarily available meteorological measurements, the rate of atmospheric warming or cooling at the point can be determined.

The device 22 is used at night. It may be flown, as noted, or it may be supported from a stationary mounting. In the latter case it may be of use, for example, to a farmer in enabling him to determine the likelihood of a frost more accurately than he could from a weather forecast.

The shells could be molded or otherwise formed, and could be evacuated and made leak-proof.

In the form of the invention in which the inter-shell medium (exclusive of the reinforcing struts) is substantially a vacuum, there is no problem of heat transfer by conduction and convection, so that the relative sizes of the shells are not critical. For such a construction film or sheet materials of high radiation transparency within the noted wavelength range, such as "KRS-5," silver chloride, polyethylene or Mylar may be employed for the outer shell.

While a preferred embodiment has been described in some detail, it should be regarded as an example of the invention and not as a restriction or limitation thereof as changes may be made in the construction and arrangement of the parts without departing from the spirit and scope of the invention.

We claim:

1. In combination with a balloon and telemetering apparatus carried thereby, an infrared radiation detector comprising an outer shell carried by the balloon and exposed to the atmosphere, an inner shell enveloped by and connected to and spaced from the outer shell and substantially insulated by the outer shell and the intervening medium from effects of atmospheric convection, the outer shell and medium being highly transparent to and the inner shell being highly absorbent of terrestrial and atmospheric infrared radiation, a temperature-sensitive variable electronic circuit element secured in and spaced from the inner shell, and means connecting the element into the circuitry of the telemetering apparatus.

2. The structure of claim 1, characterized in that the shells are formed of film and contain gas and are gas-pervious to insure equalization of pressure at both faces of each shell.

3. The structure of claim 1, characterized in that the element-connecting means including means suspending the shells from the telemetering apparatus at a distance sufficient to insulate the outer shell from heat from the telemetering apparatus.

4. The structure of claim 1, together with an outer temperature-sensitive variable electronic circuit element matched with the inner element and exposed to the atmosphere and electrically connected into the circuitry of the telemetering apparatus.

5. A device of the character described, comprising an atmospheric convection shield, a body enveloped by and connected to and spaced from the shield, the shield and the medium between the shield and the body being highly transparent to and the body being highly absorbent of terrestrial and atmospheric infrared radiation, and means including a temperature-sensitive variable electronic circuit element in the body for indicating substantially the temperature of the body.

6. In a device of the character described, a shell which is substantially a black body to terrestrial and atmospheric infrared radiation, the shell being of such size and light weight as to have a negligible time constant, temperature sensing means including a temperature-sensitive variable electronic circuit element enveloped by the shell, and means for connecting the sensing means to a telemetering apparatus for coding the sensed temperature.

7. A device of the character described, comprising an outer shell adapted to be externally exposed to the atmosphere, an inner shell enveloped by and spaced from the outer shell and substantially insulated by the outer shell and the intervening medium from the effects of atmospheric convection, the outer shell and medium being highly transparent to and the inner shell being highly absorbent of terrestrial and atmospheric infrared radiation, and means including a temperature-sensitive variable electronic circuit element adjacent, and responsive to the temperature of the inner shell for indicating the temperature of the inner shell.

8. The structure of claim 7, characterized in that the outer shell contains gas and is leaky to insure equalization of pressure at both faces thereof without substantial turbulence of the contained gas, the area of the outer shell being at least substantially twice the area of the inner shell, and the inter-shell spacing being at least about ¾", whereby conduction to and from and convection at the outer surface of the inner shell are substantially minimized.

9. In a device of the character described, a rigid skeleton of a polyhedron, black film secured substantially taut to the skeleton and defining a closed shell which is capable of being entirely immersed in the atmosphere and is substantially a black body to terrestrial and atmospheric infrared radiation, the area of the skeleton being minute compared to the area of the shell, a temperature-sensitive variable electronic circuit element enveloped by the shell, and electrical wiring connected to the element and skeleton and supporting the element in spaced relation to the shell.

10. The structure of claim 9, characterized in that the medium between the shell and element is a gas, the shell having a leak to enable the pressure on both faces of the film to be equalized.

11. In a device of the class described, a shell comprising a skeleton and black film secured to and maintained by the skeleton in a predetermined volumetric shape, the shell being a black body to terrestrial and atmospheric infrared radiation, and means enveloped by the shell for sensing the shell temperature, the sensing means having leads for connection to a coding device, the leads being secured to the skeleton and passing through the shell and supporting the sensing means in spaced relation to the shell.

12. The structure of claim 10, characterized in that the shell is substantially spherical.

13. A device of the class described, said device weighing about one ounce and comprising a pair of substantially spherical substantially concentric film shells spaced apart at least substantially ¾", the inner shell being at least about 6" in diameter, the outer shell being substantially perfectly transparent to and the inner shell being substantially a perfect absorber of terresterial and atmospheric infrared radiation within the wavelength range of about 1 to about 90 microns, a temperature-sensitive variable electronic circuit element within the inner shell, and means including electrical leads connected to the element for communicating the temperature thereof to a coding device, the connecting means being secured to one of the shells and sufficiently stiff to support the element in spaced relation to the inner shell.

14. A device of the character described, comprising an atmospheric convection shield, a shell enveloped in and connected to and substantially entirely spaced from the shield, the shield and the medium between it and the shell being substantially transparent to terrestrial and atmospheric infrared radiation, a temperature-sensitive variable electronic circuit element enveloped by and spaced from the shell, means including electrical leads extending from the element through and connected to the shell and shield for connecting the element into the circuitry of a telemetering apparatus, the outer surface of the shell consisting of an upwardly facing area and a downwardly facing area, one of the areas being substantially a black body to such radiation, the other area being a substantially perfect reflector of such radiation.

15. A device of the character described, comprising an atmospheric convection shield, and a shell enveloped by and spaced from the shield by a medium which is substantially a vacuum, the shield being substantially transparent to and the shell being substantially absorbent of infrared radiation.

References Cited in the file of this patent

UNITED STATES PATENTS

| | | |
|---|---|---|
| 1,553,789 | Moeller | Sept. 15, 1925 |
| 2,083,317 | Dallenbach | June 8, 1937 |
| 2,216,161 | Curtiss et al. | Oct. 1, 1940 |
| 2,347,160 | Wallace | Apr. 18, 1944 |
| 2,768,527 | Stern et al. | Oct. 30, 1956 |